United States Patent [19]

Otto

[11] Patent Number: 5,476,715

[45] Date of Patent: Dec. 19, 1995

[54] PARTICULATE ADSORBENT FOR THE REMOVAL OF BIOMACROMOLECULES SUCH AS LDL AND ENDOTOXINS FROM WHOLE BLOOD IN EXTRACORPOREAL CIRCUITS

[75] Inventor: Veit Otto, St. Wendel, Germany

[73] Assignee: Fresenius AG, Bad Homburg VDH, Germany

[21] Appl. No.: 127,695

[22] Filed: Sep. 28, 1993

Related U.S. Application Data

[63] Continuation-in-part of Ser. No. 591,396, Jan. 14, 1991, abandoned.

[30] Foreign Application Priority Data

Oct. 3, 1989 [DE] Germany ............................ 39 32 971.2

[51] Int. Cl.$^6$ .................................................. B32B 27/30
[52] U.S. Cl. ................................. 428/407; 428/402; 604/5
[58] Field of Search .................................... 428/402, 407; 604/5

[56] References Cited

FOREIGN PATENT DOCUMENTS

| | | |
|---|---|---|
| 0110409 | 1/1983 | European Pat. Off. . |
| 0225867 | 12/1983 | European Pat. Off. . |
| 0110409 | 12/1983 | European Pat. Off. . |
| 0143369 | 11/1984 | European Pat. Off. . |
| 3617672 | 3/1987 | Germany . |
| 3617672 | 12/1987 | Germany . |
| 732207 | 5/1980 | U.S.S.R. . |
| 2101906 | 7/1982 | United Kingdom . |

OTHER PUBLICATIONS

"Immobilization of Proteins on TOYOPEARL gels", Hagi et al, pp. 13–21, Feb. 1981.
"Fractogel TSK for Gel Chromatography, ion Exchange Chromatograph and Affinity Chromatography—Operating ranges and new modifications", W. G. Dorner, Inzell GIT Fachz. Lab 27 (1983) 380–389, May 1983.
Jour. of Chromatography, 239 (1982) 747–754.
2nd. Soor–Lor–Lux–Meeting on Advanced Materials and Nono–Composite Techniques (Oct. 1992).
Lipid Apheresis by Hemoperfusion: In–Vitro Efficacy and Ex–Vivo Bio–Compatibility of a New LDL Adsorber Compitable with Human Whole Blood, Sep. 1993.
European Search Report EP 90 11 8896, Feb. 13, 1991.

Primary Examiner—D. S. Nakarani
Attorney, Agent, or Firm—Omri M. Behr; Matthew J. McDonald

[57] ABSTRACT

A material for the elimination of biomacromolecules, in particular LDL and endotoxins from a whole blood circuit, comprising an adsorbent, comprising a porous carrier material of a homo-, co-, or terpolymer of acrylic acid and/or methacrylic acid with a particle range of between 50 and 250 µm, an exclusion level of at least $5 \times 10^5$ daltons, as well as organic ligands which are covalently bound to the carrier material via a spacer, wherein the carrier material has a spherical shape and suitably, the spacer contains no double bonds.

5 Claims, 8 Drawing Sheets

RECOVERY OF BLOOD PLATELETS USING DIFFERENT TYPES OF SPACERS

PRESSURE / FLOW DIAGRAM FOR LDL-ADSORPTION

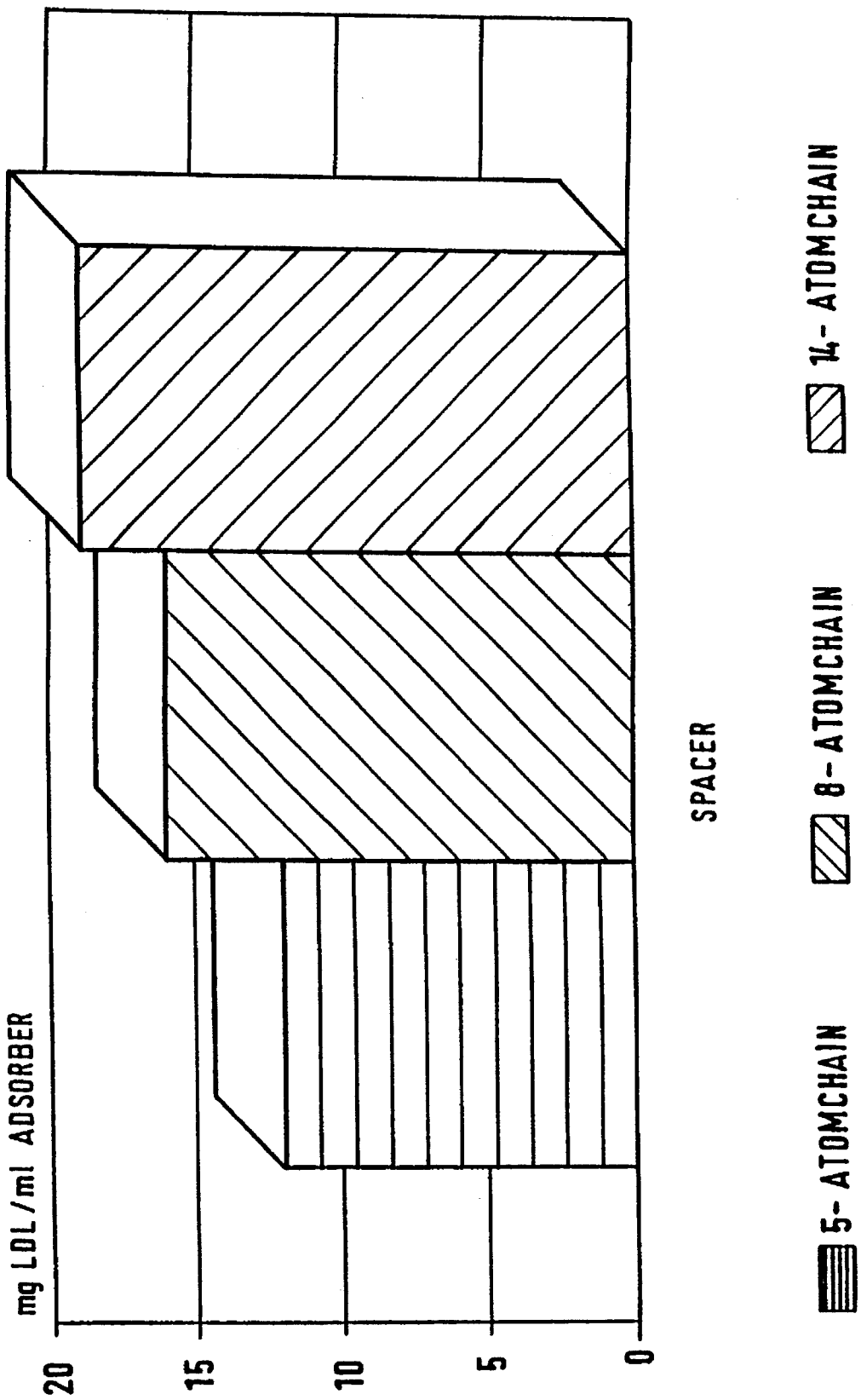

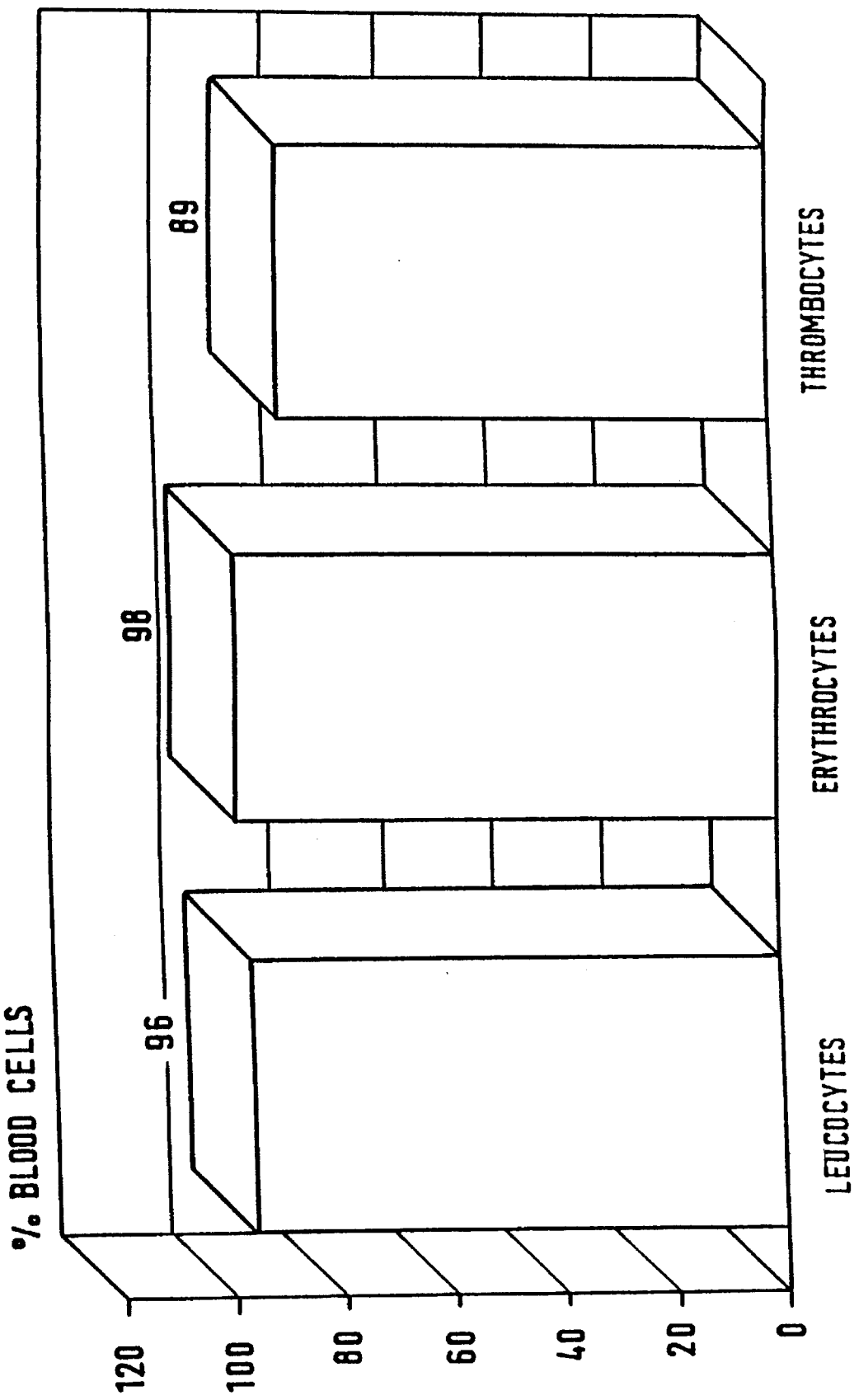

FIG.6a

CARRIER—O—CH$_2$—CH(OH)—CH$_2$—NH—CH$_2$—CH$_2$—N=CH—CH$_2$—CH$_2$—CH$_2$—CH=N—Pol.

FIG.6b

CARRIER—O—CH$_2$—CH(OH)—CH$_2$—NH—CH$_2$—CH$_2$—NH—CH$_2$—CH$_2$—CH$_2$—CH$_2$—NH—Pol.

PARTICULATE ADSORBENT FOR THE REMOVAL OF BIOMACROMOLECULES SUCH AS LDL AND ENDOTOXINS FROM WHOLE BLOOD IN EXTRACORPOREAL CIRCUITS

RELATED APPLICATIONS

This application is a continuation in part of applicants copending application Ser. No. 07/591,396 filed 01/14/91, now abandoned.

BACKGROUND OF THE INVENTION

It is well accepted in the art that it is preferable to undertake the cleansing of whole blood rather than blood plasma in extracorporeal circuits, since such a procedure requires substantially less equipment and also reduces the requirement of supervision by additional professionally trained personnel, who are not always available in every hospital. In the cleansing of whole blood, it is not necessary to expand substantial efforts in the prior removal of cells (i.e., leuco-, erythro- and thrombocytes), for example in the filter, which also requires constant supervision.

Heretofore, the cleansing of whole blood ex-vivo, utilized adsorbents of activated charcoal or activated charcoal bearing certain coatings, such as those provided by solutions of polyacrylic acid or polyacrylic acid and polyethyleneimine (see USSR SU 732,207).

Such activated charcoal adsorbents, because of their origin in activated charcoal, however suffer from the disadvantage of reduced mechanical stability in particular at high pressures, as well as a low level of selectivity, with respect to the biomacromolecules to be removed.

As a consequence of the foregoing, considerable experimentation was undertaken to replace adsorbents based on charcoal (as well as, for other reasons, those based on other inorganic materials) by, for example, modified natural or synthetic polymers which had a higher mechanical stability and a higher level of selectivity for the elimination of certain body generated, in particular pathogenic biomacromolecules, in body fluids such as blood, plasma, or serum.

By use of the process of suspension polymerization, certain porous homopolymers as well as co- or terpolymers of vinyl containing monomers, for example, acrylic acid have received particular attention as carrier materials.

Such acrylic acid polymers are presently available in commerce, for example, "TSK-Gel Toyopearl®, manufactured by Toyo Soda Kogyo Co., Ltd, Japan and Toso Haas, Philadelphia, PA, U.S.A.) and Fractogel® TSK (manufactured by Merck GmbH, Darmstadt, Federal Republic of Germany). Such substances are designated as hard gels which, in a chemical sense, are substantially identical, and, due to the presence of hydroxyl groups, are also hydrophilic. These polymers are available in a form in which the individual particles are substantially spherical, not aggregated and have pores whose surface is available for reaction. These polymers, per se, are chemically compatible with whole blood.

These materials not only in their original form, but especially after modification (activation) by reaction first with an oxirane containing compound, for example, epichlorohydrin and the subsequent reaction with ammonia, an amino, or carboxyl containing compound, or with cyanuric chloride, may be used as carrier materials (see for example J. Chromatogr. 239, 747–754 (1982)) and Toya Soda Kenkyuhokoku, 25 (2), 81–88 (1981)). As further examples of such modified products which could be used as adsorbents or carrier materials in adsorbents, there may be mentioned those which are activated with glutaraldehyde and then reduced, for example, with sodium borohydride (see Shinjikkenkagaku-koza, ed. S. Ishii, Maruzen, Tokyo, 141 (1978)).

Such activated carriers offer the possibility of having a specific operating mode. By the use organic bridging members of different chemical structure and length (generally known as spacers) one may introduce specific covalent organic ligands. Thus, one can produce so-called specifically tailored adsorbents of higher selectivity with respect to the biomacromolecules which one wishes to remove from the system.

Thus, in EP-A 83 112 042, certain adsorbents are suggested as particularly suitable for the selective removal of VLDL (lipoprotein of very low density) and/or LDL (lipoprotein of low density) from body fluids such as blood or plasma in an extracorporeal circuit. Such materials utilize as carrier material Toyopearl® TSK of the type HW 75, 65, 60 as well as 55 (having a grain size of approximately 50 to 100 µm) (see in comparison Examples 1 and 2 of the EP application), each however having different exclusion limits, to which, after reaction with epichlorohydrin, a ligand, such as heparin or chondroltin-polysulfate is covalently bound.

In DE-OS 36 17 672, there are named a substantial number of porous adsorbents for analytical uses including those which are suitable for the elimination of pathogenic biopolymers from aqueous fluids such as body fluids, for example, blood, plasma or serum, which comprise an organic solid phase as the carrier material which, via a covalently bound bridge member (spacer), which may be a mercapto-, amino-, and/or carboxyl group containing mono-, oligo-, or polymer and is covalently bonded to a ligand, suitably a polycarboxylic acid or a derivative thereof which can be converted into the free acid form. The carrier material is pretreated with a coupling agent suitably an epoxy compound such as a diglycidal compound which can subsequently be reacted (derivatized) with an amino compound such as ammonia to form the bridge member. The thus modified carrier material is then further reacted, for example with a polycarboxylic acid or a derivative thereof which is further activated with a carbamino acid ester, for example, N-ethoxy-carbonyl-2-ethoxy-1,2-dihydroquinoline, to form the ligand. This earlier material is only suitable for blood analysis such as elimination of microorganism for microbiological or biotechnical uses.

Amberlite resins have been used in attempts to provide whole blood cleansing. Because of the chemical incompatibility of the resin with whole blood, such resins must be coated to make them whole blood compatible. However, such coating blocks the pores of the resin which are then no longer available for reaction with spacers and their specific ligands. The carrier material of present invention is "per se" biocompatible. It's not necessary to coat this carrier material to get a biocompatibility. By reactions with specific ligands a specifty is given for special treatment.

Many other materials may also be used as ligands. However, especially preferred are polymers or copolymers of acrylic acid and as the carrier material, the commercially available Fractogel® may be mentioned. In contrast to the adsorbed material of present invention, Ambeslite is not specific and suitable for many treatments, by different ligands.

The term biocompatibility as used herein means the use of an adsorption material for therapeutic purposes, that is to say, that the blood cleaned by the absorber is returned directly to the patient. In such circumstances, it is desirable to avoid the loss of blood cells as well as the activation of the complement system and the immune system (see Bosch, et al. (1993) Artif. Organs., 17 (7th P. 640–652)).

It is disclosed in GIT Fachz. Lab. 27, 380–389 (1983) that all types of Fractogel® TSK, that is to say, types HW 40, 50, 55 and 65 comprise spherical and entirely porous particles having a grain size for the subtype S in the range of 25–40 μm and for the subtype F, in the range of 32–63 μm. There is an exception in type HW 40 in the form of subtype C, which comprises a grain size range of 50–100 μm.

From FIG. 4 of the above-identified publication, it is clear that type HW 40 has an exclusion limit in the range of only $10^2$ to $10^4$ daltons. Thus, as a result of this relatively small pore diameter, it is unusable for the separation of larger biomacromolecules, for example, LDL which has a molecular weight greater than $10^6$.

The term "exclusion limit" is understood to be the minimum molecular weight of a molecule which, in gel permeation chromatography cannot (anymore) enter into the pores of the adsorbent. The exclusion limit of a gel can also be expressed in terms of the pore diameter of its particles.

It is further to be deduced from the foregoing publication, see in particular page 385, first column, last paragraph, that utilizing adsorbents of a smaller particle size, leads to a substantial improvement in the efficiency of separation between the biopolymers to be eliminated (at constant selectivity). For this reason, in such chromatography where high demands are made on the adsorptive properties, in particular the separation efficiency, the finest possible, that is to say "super fine" material, with a grain size in the range of 20 to 50 μm is used.

A spacer and a ligand, for example, a polycarboxylic acid, suitably a polyacrylic acid, or a Polymyxin, for example Polymyxin B, may be used in conjunction with known carrier materials formed from homo-, co-, or terpolymers of acrylic acid or methacrylic acid, such as for example, the above identified commercially available materials to provide substrates which can be utilized for the removal of biomacromolecules, for example, LDL and endotoxins from blood plasma. This is particularly so when the carrier material is chosen from the point of view of porosity, that is to say, the exclusion limit wherein, with respect to efficiency of separation, the smallest particle size is sought.

When utilized in an extracorporeal circuit with whole blood on the other hand, particles of a grain size of at least 50 μm should be utilized. This requirement is based on the fact that the largest blood cell particles present in whole blood have a diameter of approximately 20 μm, so that the sleve which holds back the adsorbed material must have a pore with of at least 40 μm, in order to let the blood cells through. It has been found that utilizing packed columns of adsorbent particles of a size of 50 μm, there is sufficient room between these particles to permit the blood cells to pass through.

Unexpectedly however, it has been found that the foregoing carrier materials having a covalently bound spacer and a ligand covalently bound thereto, for example, a polycarboxylic acid such as polyacrylic acid or Polymyxin B, having a particle size greater than 50 μm ostensibly utilizable with whole blood, when utilized for example, for the separation of LDL and endotoxins which require an exclusion limit of at least $5 \times 10^5$ daltons (measured with lypoproteins), are not suitable for the removal of such biomacromolecules because an entirely undesired thrombocyte aggregation and adhesion then occurs.

A further aspect of the absorption material is its structure. An aggregate, because of its rough outer surface, has a large contactable surface, so the thrombocytes bind thereto. It is the task of the present invention to provide spherical particles whose outer surfaces do not offer any adhesion locations.

This phenomenon of blood cell incompatibility is shown in FIG. 1 (dashed surfaces) when what one would consider as suitable adsorbent for the removal of LDL and endotoxin from full blood (that is to say, one with a particle size greater than 15 μm and a cut-off barrier of approximately $5 \times 10^5$ daltons measured with lipoproteins) was tested and found unsuitable. Here, a carrier material, i.e., the commercially available Toyopear® (HW 75 SC) was used which has a spacer and a ligand in accordance with Example 1 hereof (this material, as stated above, is made of copolymer of glycidylmethacrylate, erythrodimethacrylate and ethylene glycol). However, while this material has the appropriate particle size and exclusion limit, it is not spherical but rather exists in the form of irregularly formed aggregates.

SUMMARY OF THE INVENTION

The purpose of the present invention is to provide an adsorbent material which may be used in an extracorporeal circuit with whole blood which has, suitably, a high selectivity with respect to removal of biomacromolecules in particular, LDL and endotoxin while having an acceptable compatibility with blood cells.

The carrier material of the present invention is per se hemocompatible. By the provision of spacers with ligands thereto, a specificity is provided for various types of usage. Amberlite on the other hand, is utilized as a non-specific adsorbent.

This task is achieved in accordance with the present invention using adsorbents comprising a porous carrier material of a homo-, co-, or terpolymerizate of acrylic acid and/or methacrylic acid with a particle range of between 50 and 250 μm and an exclusion level of at least $5 \times 10^5$ daltons, as well as organic ligands which are covalently bound to the carrier material via a spacer, wherein the individual particles of the carrier material have a spherical shape and are not aggregated. They suitably have a pore size of between about 30 to about 100 nm, most suitably about 50 nm.

A further problem to be solved by this invention is the preparation of an adsorbent, in particular for the removal of endotoxins from whole blood which gives rise to the lowest possible level of retention for thrombocytes. This is solved by an adsorbent wherein the spacer contains no double bonds.

It has been found that in order to formulate adsorbents, which are in large measure suitable for the removal of endotoxins or LDL from whole blood, that it is desirable to provide the carrier material with a relatively long covalently bound spacer having between 5 and 20, suitably between 8 and 15, preferably, 13 atoms. It has also been shown that the presence of double bonds, which occur in the spacer as a result of a requirement of production, gives rise to an undesired retention level of thrombocytes (see FIG. 2). An example of a spacer containing two double bonds is the 13 atom spacer which is introduced in the reaction of OH containing carrier materials such as Fractogel® and Toyopearl® with ethylenediamine and glutaraldehyde. Surprisingly, it has been found that the hydrogenation of double bonds, for example with sodium borohydride in the conventional manner, gives rise to an adsorbent which retains much lower amounts of thrombocytes (see FIG. 2, right).

It has further been found that the carrier material, per se, must be chemically compatible with whole blood while maintaining the aforesaid pore size. Thus Amberlite resins cannot be used, because the coating needed to make them whole blood compatible, will block the pores. Thus the spacers and the ligand cannot be attached to them.

A further aspect of the present invention is that by means of the presence of large pores, even the internal upper surface is utilized. Thus it is possible, by using spherical particles, to achieve a sufficiently high adsorption despite the circumstance that relative to its volume, a sphere has a rather small surface area.

BRIEF DESCRIPTION OF THE DRAWINGS

FIG. 4 is a block diagram showing the influence of spacers of different length on the LDL adsorption capacity.

FIG. 5 is a block diagram showing the recovery of blood cells of the three different types.

FIGS. 6a and 6b show the structure of a 13 atom spacer before and after hydration.

The invention may be further illustrated by the following examples.

EXAMPLE 1

Figure 10:
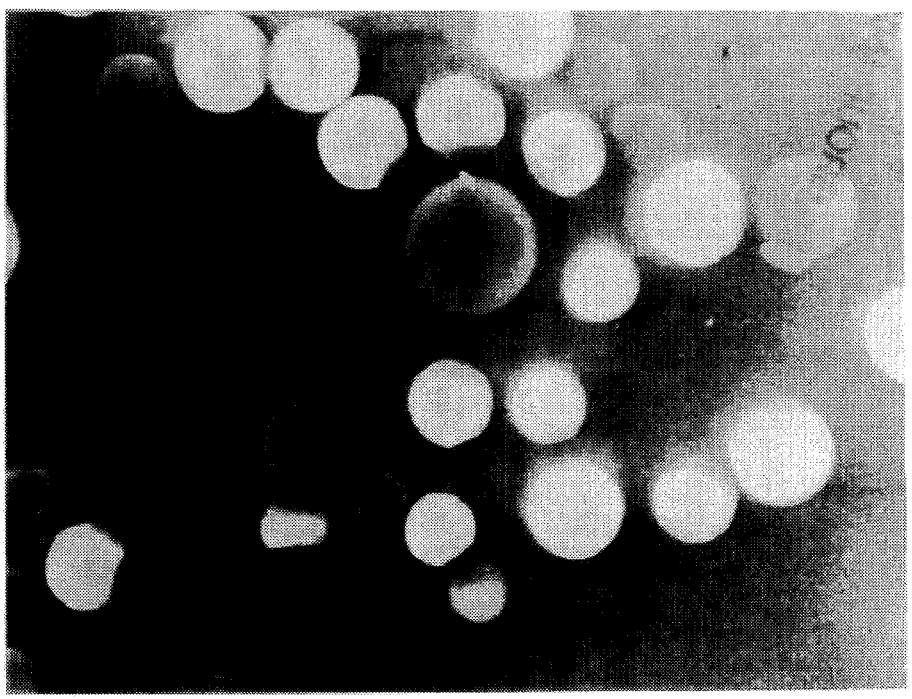
FIGS. 10, 11 and 12 are metal shadow electronmicrographs of the same material as in FIGS. 7, 8 and 9 in spherical form, the bar at the side represents a distance of 100 micrometers.
Figure 11:
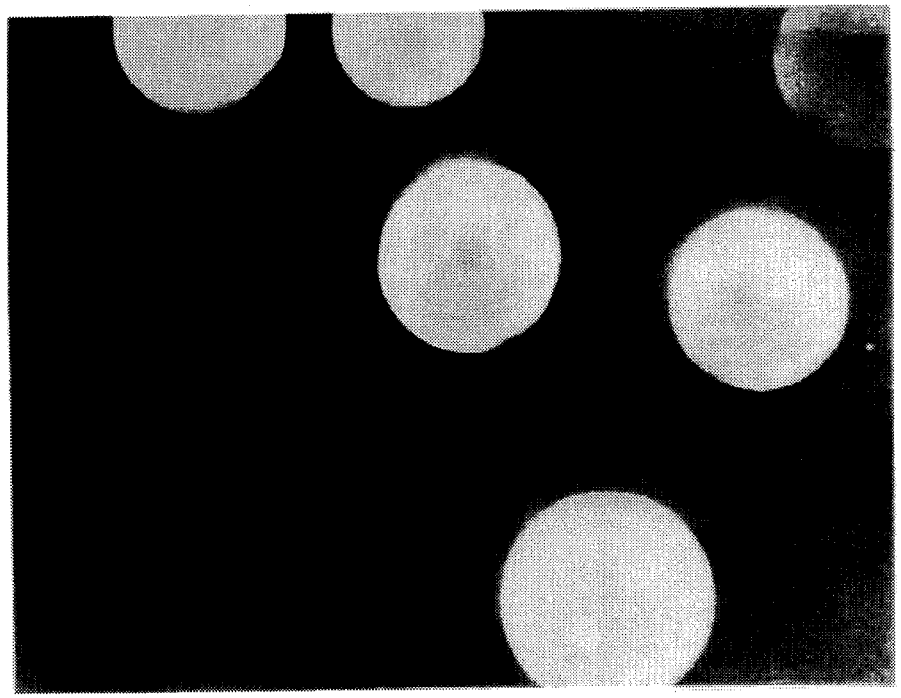
Figure 12:
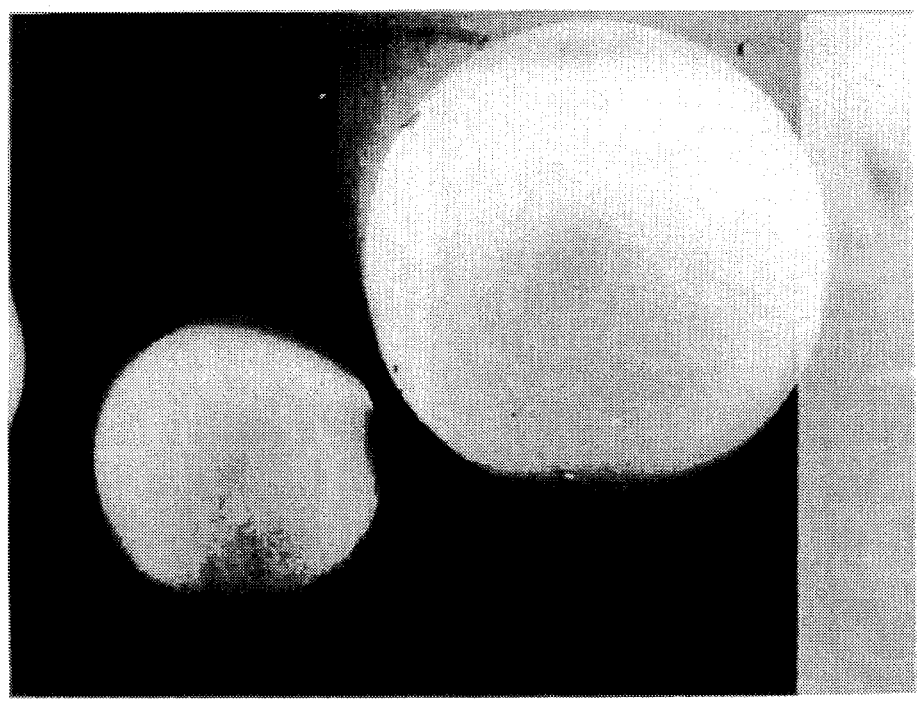

In this example, there will be described the formation of an adsorbent suitable for the removal of LDL from whole blood wherein, as well as in Example 2, there is utilized as the starting carrier material Toyopearl®, under the Internal characterization, HW 70 SC (56H), manufactured by Toyo Haas Company, Philadelphia, PA, U.S.A., under the electron microscope, this material was spherical (see FIG. 10). This product is a copolymer of ethylene glycol, glycidyl-methacrylate and erythritol-dimethacrylate.

Figure 7:
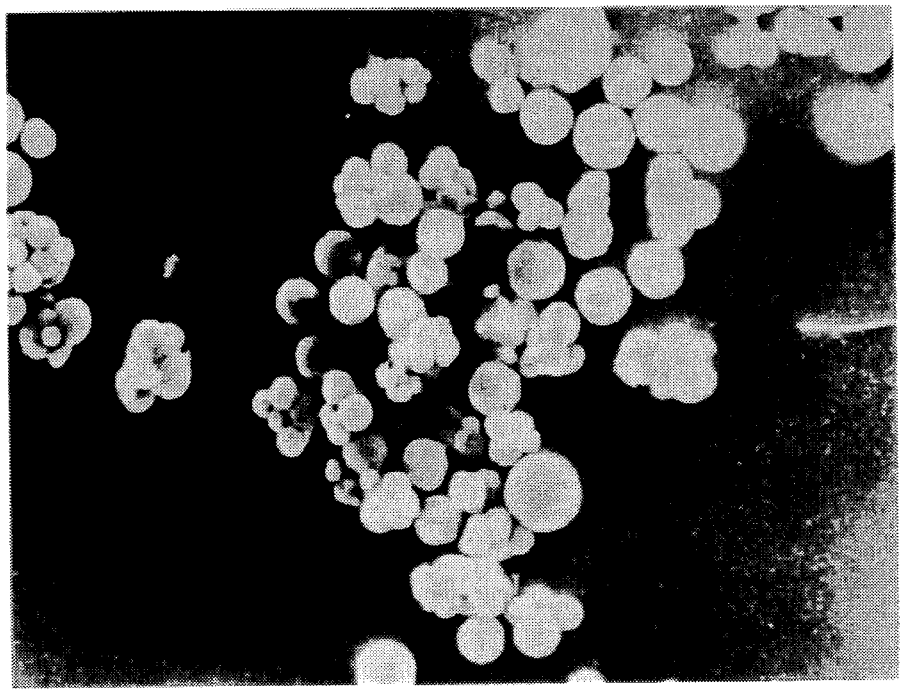
FIG. 7, 8 and 9 are metal shadow electronmicrographs of a Toyopearl containing carrier materials in non-spherical form at different magnifications, the bar at the side represents a distance of 100 micrometers.
Figure 8:
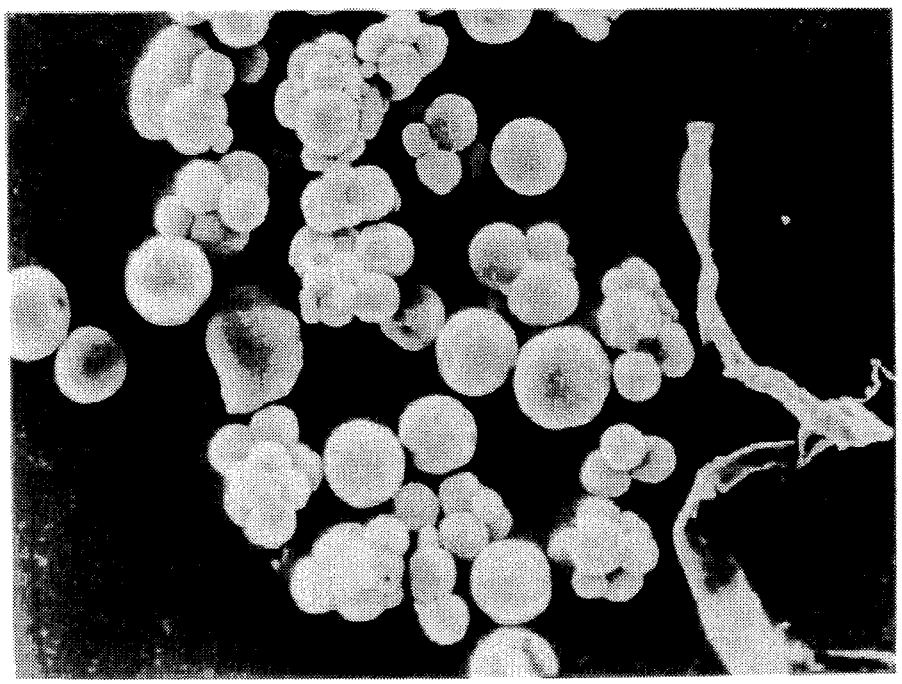
Figure 9:
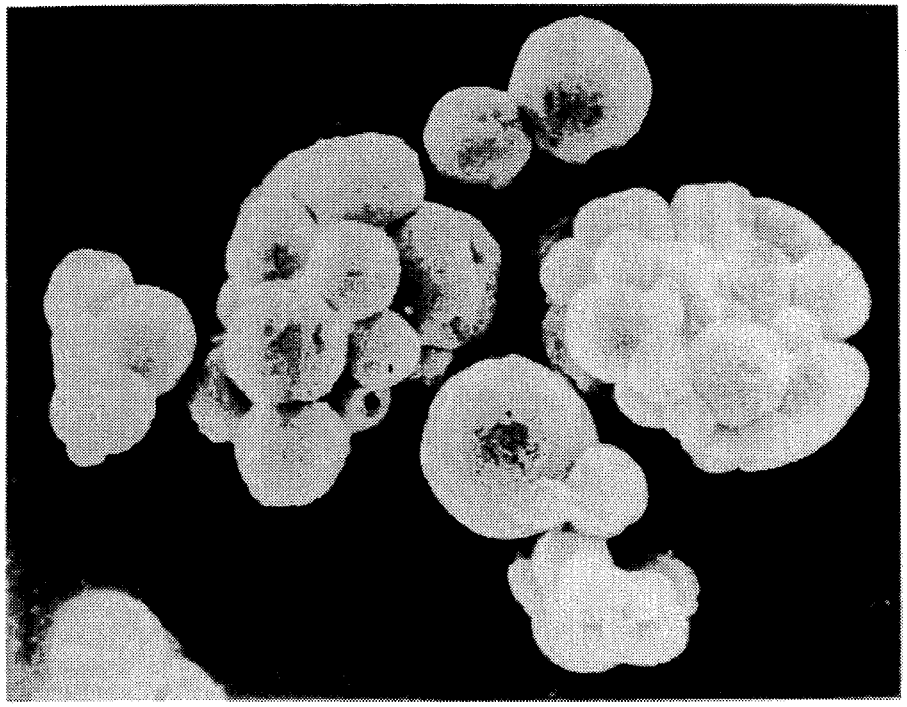

The adsorbent utilized for the following comparison tests for blood cell compatibility comprises, as the carrier material, the known commercial product Toyopearl® 76 SC, which may be distinguished from the foregoing described product in that is is not spherical. Furthermore, it demonstrated (as a result of particle aggregation) an irregular condition (see FIG. 7) at the same particle size.

The foregoing carrier material is amino derivatized in the usual manner, namely as follows:

a) epichlorohydrin followed by ammonia, whereby a 5 atom spacer is introduced;

b) with epichlorohydrin and ethylenediamine, whereby an 8 atom spacer is introduced;

c) with 1,4-butandiol-diglycidoxyether and then ammonia, whereby a 14 atom spacer is introduced.

The preparation of the amino derivatized carrier (b) has been carried out as follows:

The Toyopearl® gel was washed on a glass filter (G-1) with distilled water and dried in vacuo at 60° C. Fifty grams of the dried gel, 300 ml of 1N-NaOH, and 11 ml of epichlorohydrin were placed in a 500 mi-separable flask and stirred for 3 hours at 30°, filtered by a glass filter (G4) and washed with cold distilled water. This gel was placed in a 500 ml-separable flask with 63 ml of ethylenediamine, 35 mol distilled water and stirred for 1.5 hours at 80° C. After the reaction, the mixture was filed by a glass filter (G4), the gel was washed with acetone several times to remove unreacted ethylenediamine and dried in vacuo at 60° C. overnight.

For the introduction of polyacrylic acid as a ligand 200 mg of polyacrylic acid were dissolved in 12 ml at 0.15M aqueous sodium chloride to which were added 200 mg of N-ethoxycarbonyl-2-ethoxy-1,2-dihydroquinoline as activating agent. After 30 minutes, the above described amino derivatized carrier material was added to the polyacrylic acid solution. The mixture was permitted to react at room temperature for 12 hours. The composite adsorbent on the spherical carrier material was subjected to a battery of tests:

A) Whole Blood Measurement/Specific Binding Capacity

These were carried out with an adsorbent in accordance with Example 1 for the determination of the LDL binding capacity obtained from fresh blood drawn from healthy volunteers.

2 ml. of the adsorbent of Example 1 were charged to a 10 m. diameter column. 20 ml. of fresh blood treated with ACDA (citrate anticoagulant) (1:1) and pumped through the adsorber at the rate of 1 ml. per minute. The blood cells were measured before and after this treatment.

The adsorbent produced in accordance with Example 2 however was utilized for the measurements of the endotoxin binding capacity in physiological aqueous sodium chloride (standard: E. coli 055:B5). For an adsorbent produced in accordance with Example 1(a), an LDL binding capacity of 8 mg/ml. of adsorbent was given. In vitro tests with human blood which were carried out to determine the effect of spacer lengths in the adsorbents according to Examples 1a, 1b and 1c, with respect to LDL capacity, are shown in FIG. 4.

Blood Cell Compatibility

Figure 1:
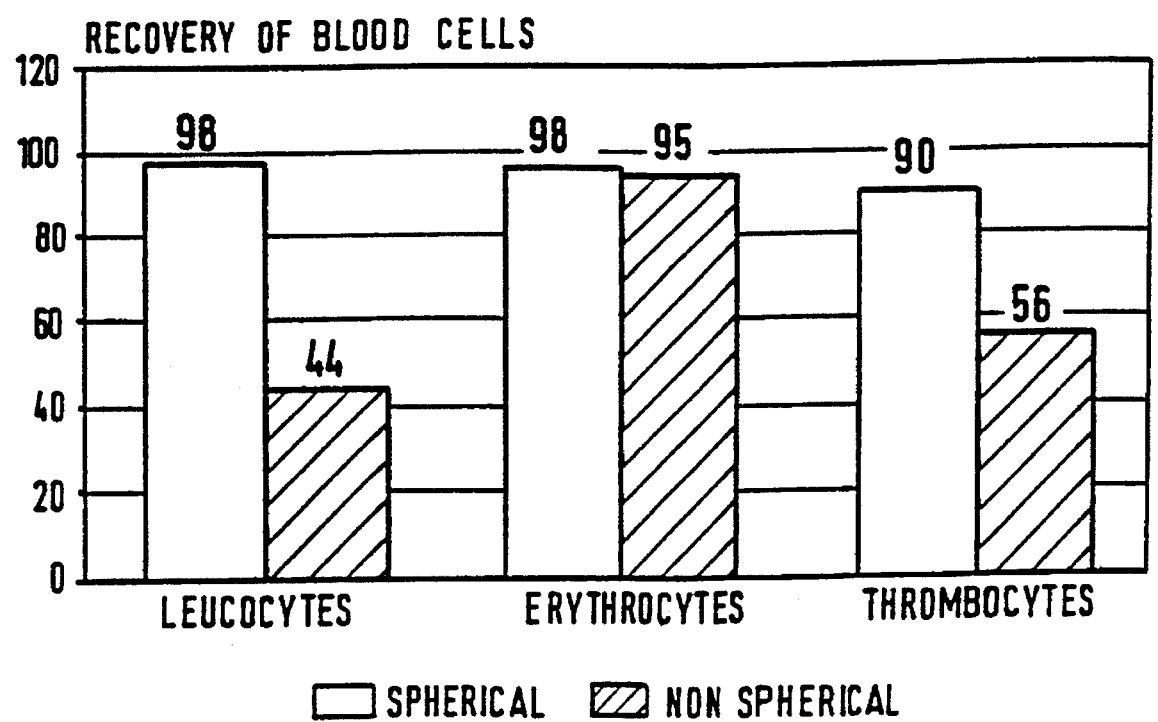
FIG. 1 is a block plot showing recovery of blood cells of different types for spherical and non-spherical carriers.

An adsorbent was produced in accordance with Example 1, however, utilizing the non-spherical adsorbent (Toyopearl® (HW 75 SC)). Tests were carried out with 20 ml. of blood/2 ml. of adsorbent. The results are illustrated in FIG. 1. They show a substantial superiority of the adsorbent in the spherical form over the non-spherical form, with respect to compatibility with leuco- and thrombocytes.

Toxicological Experiments

The following toxicological experiments were carried out with respect to the LDL adsorbent:
1. Physicochemical tests (USP XXI)
2. Systematic Acceptability in the Mouse (USP XXI)

3. Intracutaneous Test with Rabbits (USP XXI)
4. Sensitization Test with Guinea Pigs (OECD Guideline No. 406)
5. Hemolysis Test with Rabbits
6. Agar Overlay Test (Compare Evaluation of Hemodialysis Membranes, U.S. Depart. Health and Welfare, 1977, Publ. No. NIH-77/1234).
7. Ames Test, (OECD Guideline No. 471).

None of these tests showed the presence of any toxic effect. The adsorptive material is therefore biologically compatible.

Pressure Stability 400 ml. of adsorber produced in accordance with Example 1 was packed into an adsorption housing of 48 mm. diameter.

Figure 3:
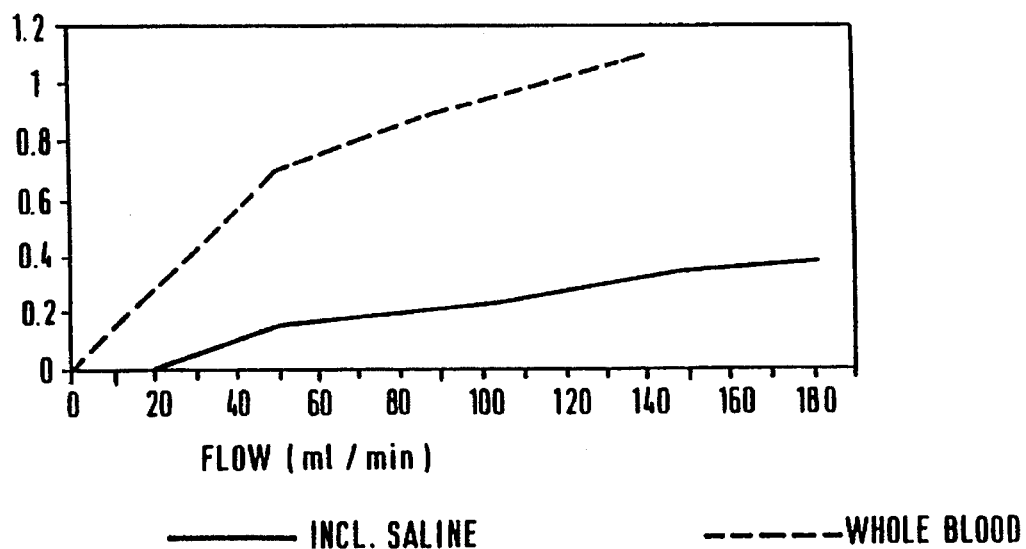
FIG. 3 is a comparative pressure/flow diagram for adsorption in whole blood and saline.

Whole blood was pumped over 15 minutes through the adsorber at a plurality of rates. The pressure was measured at the filter input. The pressure was found to be constant over 15 minutes. The pressure flow diagram is shown in FIG. 3. The stability of pressure, as well as the linearity of the pressure flow diagram, shows that the adsorber is stable at these pressures.

Utilizing the same housing and similarly utilizing 400 m. of an adsorbent produced in accordance with Example 1, a particle count was carried out in accordance with the provisions of DIN Schedule 58 362 (determination of particulate impurity levels).

| Size of Particles (μm) after passage of 10 liters | 25–50 | 51–100 | Over 100 |
| --- | --- | --- | --- |
| Number of Particles | 31 | 2 | 2 |

All of these experiments were carried out with sterilized absorbent which had been previously autoclaved at 121° C. for 30 minutes.

EXAMPLE 2 the spherical carrier material described in Example 1 was treated, in a manner well known in the art, with epichlorohydrin and subsequently with ethylenediamine or with 1,4-butandiol-diglycidoxyether, followed by ethylenediamine to produce an activated carrier material.

In this procedure, 40 grams of carrier material were dissolved in 125 ml. of a 1 molar aqueous sodium hydroxide solution with 8.25 ml. of epichlorohydrin or with 1,4-butandiol-diglycidoxyether, followed by 47 ml. of ethylenediamine.

The thus activated carrier material was incubated for 12 hours with a 5% aqueous solution of glutardialdehyde. These procedures introduced into the carrier material—a 13 atom spacer and a 19 atom spacer respectively, each containing two double bonds. The structure of the 13 atom spacer (before and after hydrogenation) is shown in FIG. 6, wherein the term "POL" shows a polymyxin ligand bound thereto.

Thereafter, Polymyxin B was covalently bound to the ligand in the conventional manner in which the coupling reaction was carried out in 250 ml. of a 10 mM solution of magnesium chloride containing 0.6 g. of Polymyxin B sulfate to yield adsorbent (I).

A portion of the adsorbent with the 13 atom spacer was hydrogenated in the usual manner with 5% aqueous sodium borohydride to hydrate the double bonds of the spacer to yield adsorbent (II).

Figure 2:
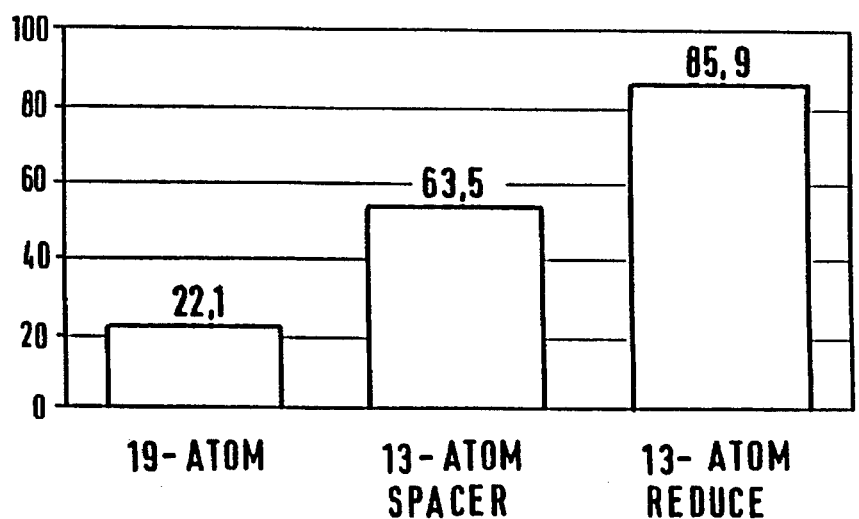
FIG. 2 is a block plot showing recovery of blood platelets using different types of spacers.

The retention of thrombocytes was examined, utilizing 20 ml. of blood/2 ml. of adsorbent with (I) (with unreduced spacer), as well as (II) (with reduced spacer) for the 13 atom spacer as well as the 19 atom spacer. The surprising result, as shown in FIG. 2, was that (II) showed the retention of a substantially smaller number of thrombocytes.

EXAMPLE 3

In accordance with the detailed description set forth immediately below, spherical carrier material based upon methacrylic acid terpolymer was amino derivatized in accordance with Example 1, an 8 atom spacer introduced and bonded to the polyacrylic acid in a covalent manner as described in Example 1, whereby an adsorbent was obtained which proved itself to be useful in the separation of LDL from whole blood.

The starting carrier material was a terpolymer of methacrylamide, N-methylene-bis-methylacrylamide and allylgylcidylether, having a size distribution of spherical particles in the region of 50 to 200 μm and an exclusion limit of $>5\times10^5$ daltons. These particles have a macroporous structure comprising channels, openings and cavitations. The pore volume (determined by the mercury method) was 1.74 cm$^3$/g and the mean pore diameter was 35 nm. The specific BET-surface (isothermal nitrogen adsorption) was 183 m$^2$/g.

Toxicological determinations (USP XXI) showed that the carrier material and the adsorbent produced therefrom are toxicologically harmless. It was also shown further to be biologically compatible.

The method utilized in Example 1 showed the LDL binding capacity of the adsorbent from whole blood to be 3.6 mg./ml.

This value is less than that obtained for the measurements of the material produced in accordance with Example 1(a) which can be explained by the fact that the adsorbent of the present Example 3 has a smaller exclusion limit than the adsorbent of Example 1.

The blood cell compatibility of the adsorbent is carried out in accordance with procedures of Example 1. The results are shown in FIG. 5. The adsorbent thus illustrates an unexpectedly low level of retention for leucocytes, erythrocytes and thrombocytes.

We claim:

1. An adsorbent material, for the elimination of biomacromolecules, in particular LDL or endotoxins from a whole blood circuit, comprising a porous carrier material compatible with whole blood, and consisting of spherical unaggregated particles of a homo-, co-, or terpolymer resulting from the polymerization of at least one monomer, said monomer selected from the group consisting of acrylic acid, methacrylic acid, and acrylamide, having a particle grain size of between 50 and 250 μm, an exclusion limit of at least 5×10$^5$ daltons, spacers having one end thereof covalently bound to the carrier material and organic ligands covalently bound to the free ends of said spacers.

2. The adsorbent in accordance with claim 1, wherein the spacers contain no double bonds.

3. The adsorbent in accordance with claim 1 wherein the carrier material has a particle size of between 50 and 150 μm.

4. The adsorbent in accordance with claim 2, wherein the spacers have between 5 and 20 atoms.

5. The adsorbent in accordance with claim 2, wherein the spacers have between 8 and 15 atoms.

* * * * *